United States Patent
Xiao et al.

(10) Patent No.: US 12,461,104 B2
(45) Date of Patent: Nov. 4, 2025

(54) DETECTION DEVICE AND DETECTION METHOD OF DOT IMMUNOBLOTTING DETECTION

(71) Applicant: AFFILIATED HOSPITAL OF NANTONG UNIVERSITY, Jiangsu (CN)

(72) Inventors: Mingbing Xiao, Jiangsu (CN); ZhaoXiu Liu, Jiangsu (CN); Wei Shi, Jiangsu (CN); Zhifeng Gu, Jiangsu (CN); Minxue Xu, Jiangsu (CN); Zhonghua Tan, Jiangsu (CN)

(73) Assignee: AFFILIATED HOSPITAL OF NANTONG UNIVERSITY, Jiangsu (CN)

( * ) Notice: Subject to any disclaimer, the term of this patent is extended or adjusted under 35 U.S.C. 154(b) by 920 days.

(21) Appl. No.: 17/593,787

(22) PCT Filed: Mar. 24, 2020

(86) PCT No.: PCT/CN2020/080798
§ 371 (c)(1),
(2) Date: Sep. 24, 2021

(87) PCT Pub. No.: WO2020/224344
PCT Pub. Date: Nov. 12, 2020

(65) Prior Publication Data
US 2022/0187302 A1   Jun. 16, 2022

(30) Foreign Application Priority Data

May 5, 2019 (CN) .......................... 201910367764.7

(51) Int. Cl.
*G01N 33/574* (2006.01)
*G01N 33/53* (2006.01)

(52) U.S. Cl.
CPC ... *G01N 33/57438* (2013.01); *G01N 33/5304* (2013.01); *G01N 2333/75* (2013.01)

(58) Field of Classification Search
CPC ........... B01L 2200/026; B01L 2200/16; B01L 2400/049; B01L 3/5023; B01L 9/52; G01N 2333/75; G01N 2474/10; G01N 33/5304; G01N 33/54366; G01N 33/57438; Y02A 50/30
See application file for complete search history.

(56) References Cited

U.S. PATENT DOCUMENTS

2004/0185577 A1   9/2004 Suri et al.

FOREIGN PATENT DOCUMENTS

| CN | 101435820 A | * | 5/2009 |
| CN | 102621300 A | | 8/2012 |
| CN | 109439517 A | | 3/2019 |
| WO | 2008122241 A1 | | 10/2008 |

OTHER PUBLICATIONS

English Translation of International Preliminary Report on Patentability Chapter I issued Nov. 2, 2021.*
Mahmood et al., "Western blot: technique, theory, and trouble shooting," N. Am. J. Med. Sci., 2012, vol. 4, No. 9, pp. 429-434.*
Machine translation of CN 101435820 A, published May 20, 2009.*
International Search Report dated Apr. 28, 2020.

* cited by examiner

*Primary Examiner* — Galina M. Yakovleva
(74) *Attorney, Agent, or Firm* — Aasheesh V. Shravah; CM Law

(57) ABSTRACT

The present invention provides a detection device of dot immunoblotting detection, including a negative pressure suction device, a hole plate, a hose for connecting the hole plate with the negative pressure suction device, and a nitrocellulose membrane in tight fit with the upper end surface of the hole plate. The present invention further provides a detection method of dot immunoblotting detection, including preparation, sample injection, blocking, incubation of a primary antibody, incubation of a secondary antibody, development and analysis. The detection method performs negative pressure suction through the negative pressure suction device, which is favorable for concentrating samples during sample injection and avoiding the influence, caused by cross contamination after diffusion of the samples, on an experimental result, and the experimental result is more accurate.

2 Claims, 2 Drawing Sheets

DETECTION DEVICE AND DETECTION METHOD OF DOT IMMUNOBLOTTING DETECTION

CROSS-REFERENCE TO RELATED APPLICATIONS

This application is a National Stage Application of, and claims priority to International Application Serial No. PCT/CN2020/080798, filed on Mar. 24, 2020, entitled "Detection Device and Detection Method for DOT Immunoblotting Detection", which claims the benefit of and priority to Chinese Patent Application No. 201910367764.7, filed on May 5, 2019, the disclosures of which are hereby incorporated by reference in their entirety.

TECHNICAL FIELD

The present invention belongs to the technical field of immunodetection, and more particularly relates to a detection device and a detection method of dot immunoblotting detection.

BACKGROUND ART

At present, Western blot or ELISA methods are often used to detect target proteins. The Western blot method is that: transferring a protein sample separated by PAGE (polyacrylamide gel electrophoresis) onto a PVDF (polyvinylidene fluoride) membrane, binding a protein antigen with an antibody corresponding to a target protein, binding a secondary antibody labeled by an enzyme or isotope and detecting an expression of the target protein in a chemiluminescence manner. The ELISA method is that: a tested sample (an antibody or antigen in the tested sample is measured) reacts with an antigen or antibody on the surface of a solid phase carrier. The formed antigen-antibody complex is separated from other substances by washing. Then, the enzyme-labeled antigen or antibody is added, and the mixture is bound to the solid phase carrier through a specific reaction. At this time, the amount of the enzyme on the solid phase carrier is in a certain ratio to the amount of a tested substance in the sample, so qualitative or quantitative analysis can be performed according to the intensity of the color. However, the two methods are complicated in operation, require a large number of samples, and cannot simultaneously take the advantages of sensitivity, specificity, multi-sample detection and the like into account.

SUMMARY

The technical problem to be solved by the present invention is to provide a detection device and a detection method of dot immunoblotting detection, so as to solve the problems proposed in the background.

To solve the above technical problem, the embodiments of the present invention provide a detection device of dot immunoblotting detection, characterized by including a negative pressure suction device, a hole plate, a hose for connecting the hole plate with the negative pressure suction device, and a nitrocellulose membrane in tight fit with the upper end surface of the hole plate. The hole plate includes an upper-layer supporting plate, a lower-layer tray hermetically connected under the upper-layer supporting plate, and a negative pressure cavity arranged between the upper-layer supporting plate and the lower-layer tray. One side of the lower-layer tray is provided with a connection pipe for allowing the hose to be in sleeve connection, and 70 through holes are formed in the upper-layer supporting plate. The size of the nitrocellulose membrane is the same as the size of the upper end surface of the hole plate.

Further, the size of the upper-layer supporting plate is 8 cm×6 cm, and the diameter of each through hole is 2 mm.

Further, the negative pressure suction device is a portable sputum aspirator, and a negative pressure value of the portable sputum aspirator is set to be 0.06 MPa.

Further, the 70 through holes are arranged in a 10×7 manner, and a distance between every two through holes is equal.

Further, the top of the hole plate is detachably connected with a pressure plate.

Wherein, the pressure plate includes a rectangular frame and fasteners rotatably connected to a periphery of the rectangular frame, and clamping blocks for allowing the fasteners to be in clamped connection are arranged at a periphery of the lower-layer tray.

The present invention further provides a detection method of dot immunoblotting detection, characterized by including the following steps:

S1, preparation: connecting a portable sputum aspirator with a hole plate through a hose, cutting a nitrocellulose membrane into a size which is the same as the size of an upper-layer supporting plate on the upper end surface of the hole plate, placing the nitrocellulose membrane onto the hole plate with 70 through holes, turning on the portable sputum aspirator, setting a negative pressure value of the portable sputum aspirator to be 0.06 MPa, and forming 70 sample injection grooves in the surface of the nitrocellulose membrane;

S2, sample injection: dividing the 70 sample injection grooves into reference substance holes and sample holes, each repeated for three times, separately adding a reference substance and 1 μL of a sample to be tested into each reference substance hole and each sample hole, and naturally air-drying the nitrocellulose membrane for 30 min at the end of sample injection;

S3, blocking: slightly placing the nitrocellulose membrane into a 5% skim milk powder solution, placing the solution onto a shaking table for blocking at room temperature for 1.5 h, then abandoning the blocking liquid, and rinsing the membrane with TBS-T once to twice, wherein the 5% skim milk powder solution is diluted with a TBS-T solution until the concentration is 5%;

S4, incubation of a primary antibody: diluting the primary antibody with a 5% bovine serum albumin solution in a ratio of 1:500, uniformly and completely immersing the nitrocellulose membrane into the diluted primary antibody, placing the mixture onto the shaking table, carrying out constant-temperature incubation at 37° C. for 4 h, and placing the nitrocellulose membrane into the TBS-T at the end of the incubation for washing for 3 times on the shaking table, 5 min at each time, wherein the 5% bovine serum albumin solution is diluted with the TBS-T solution until the concentration is 5%;

S5, incubation of a secondary antibody: diluting the secondary antibody with a 1% skim milk powder solution in a ratio of 1:5000, uniformly and completely immersing the nitrocellulose membrane into the diluted secondary antibody, placing the mixture onto the shaking table, carrying out incubation at room temperature for 1.5 h, and placing the nitrocellulose membrane into the TBS-T at the end of the incubation for washing for 3 times, 15 min at each time, wherein the 1% skim milk powder solution is diluted with the TBS-T solution until the concentration is 1%;

S6, development: laying the washed nitrocellulose membrane at a proper position of a developing device, uniformly adding dropwise a developer onto the nitrocellulose membrane, and using a gel imaging system to carry out exposure and development, and saving an image; and S7, analysis: scanning and analyzing, by means of Image J software, a gray value of an image obtained by the development, and expressing a relative concentration of a target protein of each sample by using a gray value of the sample to be tested/a gray value of a reference sample.

Further, the TBS-T solution includes Tris, NaCl, Tween®-20 (Polysorbate-20) and ddH$_2$O, wherein, the mass of the Tris is 2.42 g; the mass of the NaCl is 8.0 g; the volume of the Tween®-20 (Polysorbate-20) is 1 mL; and the volume of the TBS-T solution is supplemented to 1000 ml by using the ddH$_2$O.

Further, the sample holes can be set into a plurality of groups of sample holes according to a group number of samples to be tested.

The technical solution of the present invention has the beneficial effects that:

(1) According to the detection device of dot immunoblotting detection of the present invention, the nitrocellulose membrane is in tight fit with the 70-hole plate, and 70 sample injection grooves are formed in the surface; this negative pressure suction device is used to carry out negative pressure suction, which is favorable for concentrating samples during sample injection, so as to avoid the influence, caused by cross contamination after diffusion of the samples, on an experimental result, and the experimental result is more accurate.

(2) According to the detection device and the detection method of dot immunoblotting detection, compared with a Western blot method and an ELISA method, the dot immunoblotting detection carried by the dot immunoblotting device has the advantages of sensitivity, specificity, a small requirement for samples, simplicity, economy and rapidness, can detect a plurality of samples at one time, and is suitable for detection of lots of people.

DESCRIPTIONS OF NUMERALS IN THE DRAWINGS

Figure 1:
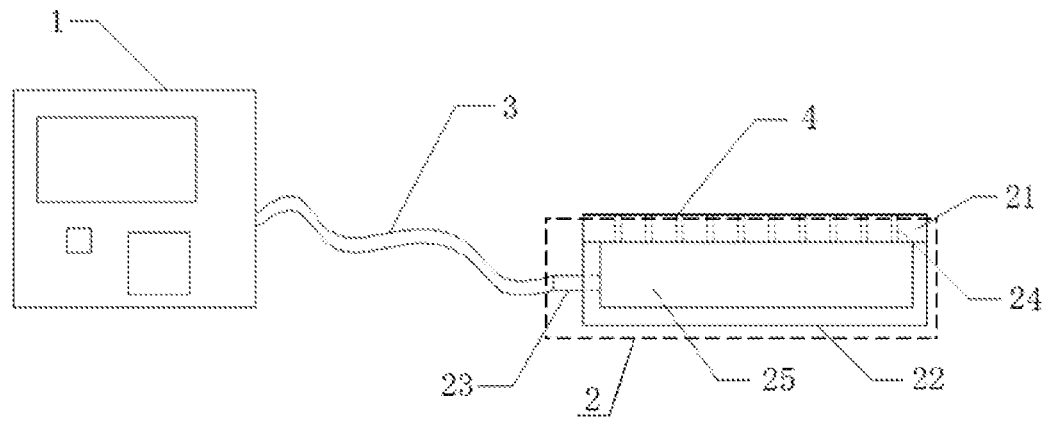
FIG. 1 is a schematic structural diagram of a detection device of dot immunoblotting detection in the present invention.

1: negative pressure suction device; 2: hole plate; 21: upper-layer supporting plate; 22: lower-layer tray; 23: connection pipe; 24: through hole; 25: negative pressure cavity; 3: hose; 4: nitrocellulose membrane; and 5: negative pressure cavity.

DETAILED DESCRIPTION OF THE EMBODIMENTS

In order to make the technical problems to be solved, the technical solutions and the advantages in the present invention clearer, detailed descriptions will be made below in combination with accompanying drawings and specific embodiments.

In the description of the present invention, it should be noted that orientations or positional relationships indicated by the terms "center", "upper", "lower", "left", "right", "vertical", "horizontal", "inside", "outside", "front", "rear" and the like are orientations or positional relationships as shown in the drawings, and are only for the purpose of facilitating and simplifying the description of the present invention instead of indicating or implying that devices or elements indicated must have particular orientations, and be constructed and operated in the particular orientations, so these terms are not construed as limiting the present invention. In addition, the terms "first", "second" and "third" are only for the purpose of description, and may not be understood as indicating or implying the relative importance.

In the description of the present invention, it should be noted that unless otherwise explicitly defined and defined, the terms "installed", "coupled" and "connected" shall be understood broadly, and may be, for example, fixedly connected, or detachably connected, or integrally connected, or mechanically connected, or electrically connected, or directly connected, or indirectly connected through an intermediate medium, or communication between two elements. Those of ordinary skill in the art can understand the specific meanings of the above terms in the present invention according to specific situations.

Figure 2:
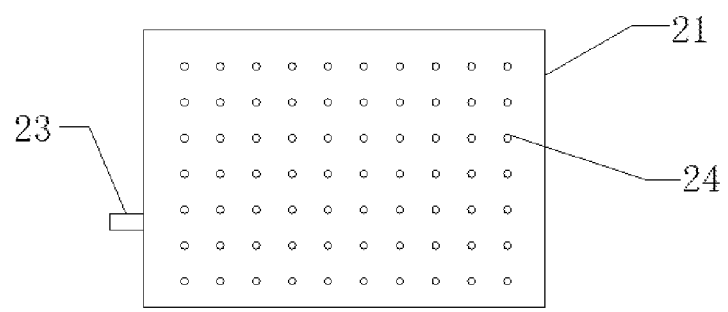
FIG. 2 is a top view of a hole plate in the present invention.

As shown in FIG. 1 and FIG. 2, a detection device of dot immunoblotting detection includes a negative pressure suction device 1, a hole plate 2, a hose 3 for connecting the hole plate 2 with the negative pressure suction device 1, and a nitrocellulose membrane 4 in tight fit with the upper end surface of the hole plate 2. Feasibly, the hose 3 may be a rubber pipe or a plastic hose. The hole plate 2 includes an upper-layer supporting plate 21, a lower-layer tray 22 hermetically connected under the upper-layer supporting plate 21, and a negative pressure cavity 25 arranged between the upper-layer supporting plate 21 and the lower-layer tray 22. One side of the lower-layer tray 22 is provided with a connection pipe 23 for allowing the hose 2 to be in sleeve connection, and 70 through holes 24 are formed in the upper-layer supporting plate 21. The size of the nitrocellulose membrane 4 is the same as the size of the upper end surface of the hole plate 2. During use, the hose 3 is used to tightly connect the connection pipe 23 of the 70-hole plate to an interface of the negative pressure suction device 1; the nitrocellulose membrane 4 is arranged on the 70-hole plate 2 to form a closed inner cavity, and then the negative pressure suction device 1 is turned on to extract air to provide a negative pressure environment, so that the nitrocellulose membrane 4 is in tight fit with the 70-hole plate 2, and 70 sample injection grooves are formed in the surface. This negative pressure suction device 1 is used to carry out negative pressure suction, and this way is favorable for concentrating samples during sample injection and avoiding the influence, caused by cross contamination after diffusion of the samples, on an experimental result.

In a further embodiment, the size of the upper-layer supporting plate 21 is 8 cm×6 cm, and the diameter of each through hole 24 is 2 mm.

In a further embodiment, the negative pressure suction device 1 is a portable sputum aspirator, and a negative pressure value of the portable sputum aspirator is set to be 0.06 MPa.

In a further embodiment, the 70 through holes 24 are arranged in a 10×7 manner, and a distance between every two through holes 24 is equal. Feasibly, the distance between the through holes is 5.5 cm to 7 cm.

In a further embodiment, the top of the hole plate 2 is detachably connected with a pressure plate.

Wherein, the pressure plate includes a rectangular frame and fasteners rotatably connected to a periphery of the rectangular frame, and clamping blocks for allowing the fasteners to be in clamped connection are arranged at a periphery of the lower-layer tray 22. The connection manner of the clamping blocks and the fasteners may refer to a connection manner of a lunch box, so as to achieve an effect of tightly pressing the nitrocellulose membrane 4. The hole plate of the present utility model is detachably connected with the pressure plate. The pressure plate presses the nitrocellulose membrane 4 on the hole plate, so as to ensure that the nitrocellulose membrane 4 is in tight fit with the hole plate.

In the present invention, the principle of the dot immunoblotting detection is that a sample to be tested is adsorbed onto the nitrocellulose membrane 4 (a NC membrane), and a solid phase carrier adsorbs proteins in a non-covalent bond form, which can keep the type and the bioactivity of a polypeptide unchanged. The protein or polypeptide on the nitrocellulose membrane 4 is used as an antigen, undergoes an immunoreaction with a corresponding antibody of a target protein, and then reacts with a secondary antibody labeled by horse radish peroxidase (HRP), and the expression level of the target protein is detected via autoradiography.

The present invention further provides a detection method of dot immunoblotting detection, including the following steps:

S1, preparation: a portable sputum aspirator is connected with a hole plate 2 through a hose 3; a nitrocellulose membrane 4 is cut into a size which is the same as the size of the hole plate 2 with 70 through holes 24, and is placed onto the hole plate 2 with the 70 through holes; the portable sputum aspirator is turned on; a negative pressure value of the portable sputum aspirator is set to be 0.06 MPa; and 70 sample injection grooves are formed in the surface of the nitrocellulose membrane 4;

S2, sample injection: the 70 sample injection grooves are divided into reference substance holes and sample holes, each repeated for three times (that is, both the reference substance hole and the sample hole have three repeated holes); a reference substance and 1 μL of a sample to be tested are added into each reference substance hole and each sample hole; and the nitrocellulose membrane is naturally air-dried for 30 min at the end of sample injection;

S3, blocking: the nitrocellulose membrane is slightly placed into a 5% skim milk powder solution; the solution is placed onto a shaking table for blocking at room temperature for 1.5 h; then, the blocking liquid is abandoned, and the membrane is rinsed with TBS-T once to twice, wherein the 5% skim milk powder solution is diluted with a TBS-T solution until the concentration is 5%;

S4, incubation of a primary antibody: the primary antibody is diluted with a 5% bovine serum albumin solution in a ratio of 1:500; the nitrocellulose membrane is uniformly and completely immersed into the diluted primary antibody, and the mixture is placed onto the shaking table; constant-temperature incubation is carried out at 37° C. for 4 h, and the nitrocellulose membrane is placed in the TBS-T at the end of the incubation for washing for 3 times on the shaking table, 5 min at each time, wherein the 5% bovine serum albumin solution is diluted with the TBS-T solution until the concentration is 5%;

S5, incubation of a secondary antibody: the secondary antibody is diluted with a 1% skim milk powder solution in a ratio of 1:5000; the nitrocellulose membrane is uniformly and completely immersed into the diluted secondary antibody, and the mixture is placed onto the shaking table; incubation is carried out at room temperature for 1.5 h; the nitrocellulose membrane is put into the TBS-T at the end of the incubation for washing for 3 times, 15 min at each time, wherein the 1% skim milk powder solution is diluted with the TBS-T solution until the concentration is 1%; in this patent, the primary antibody used in the detection of FGB in serum is an FGB mouse anti human monoclonal antibody, which is purchased from the Santa Cruz company, item No.: sc-271035, and the secondary antibody is an HRP-labeled mouse anti human monoclonal antibody, which is purchased from the Santa Cruz company, item No.: sc-516102;

S6, development: the washed nitrocellulose membrane is laid at a proper position of a developing device, and a developer is uniformly added dropwise onto the nitrocellulose membrane; and a gel imaging system is used to carry out exposure and development, and an image is saved; and S7, analysis: a gray value of an image obtained by the development is scanned and analyzed by means of Image J software, and a relative concentration of a target protein of each sample is expressed by using a gray value of the sample to be tested/a gray value of a reference sample.

In a further embodiment, the TBS-T solution includes Tris, NaCl, Tween®-20 (Polysorbate-20) and ddH$_2$O, wherein the mass of the Tris is 2.42 g; the mass of the NaCl is 8.0 g; the volume of the Tween®-20 (Polysorbate-20) is 1 mL; and the volume of the TBS-T solution is supplemented to 1000 ml by using the ddH$_2$O, as shown in Table 1 below:

TABLE 1

| Formula of TBS-T solution | |
| --- | --- |
| Tris (powder-trisaminomethane) | 2.42 g |
| NaCl | 8.0 g |
| Tween-20 | 1 mL |
| ddH2O (double distilled water) is used to make the volume to be a constant volume of 1000 mL, and the solution is saved at 4oC | |

In a further embodiment, the sample holes can be set into a plurality of groups of sample holes according to a group number of samples to be tested.

Figure 3:
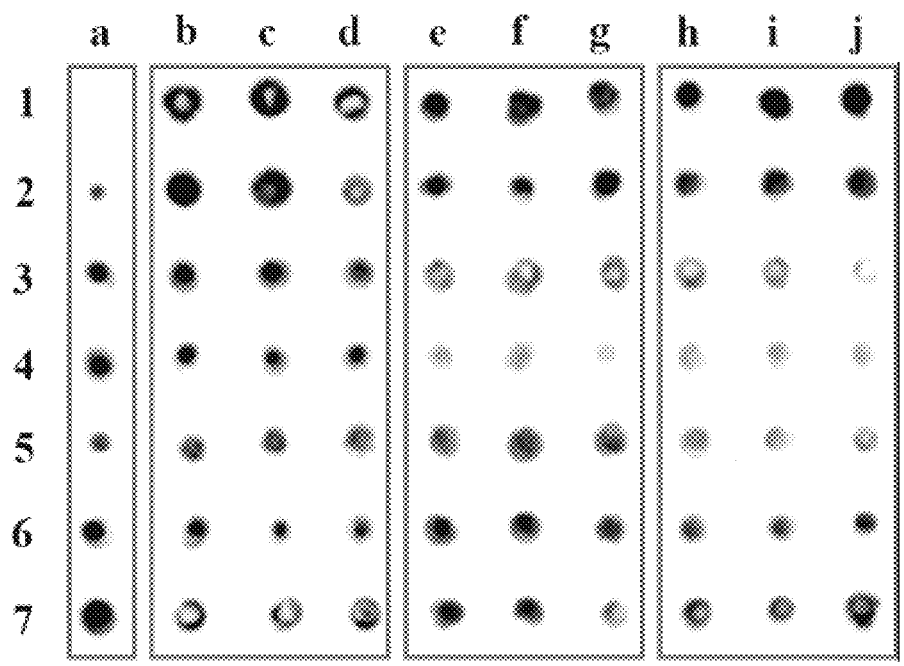
FIG. 3 is a detection result diagram of relative FGB levels of serums of a pancreatic cancer mouse group, a pancreatitis mouse group and a normal control group by a detection method of dot immunoblotting detection in the present invention.

In the present embodiment, firstly, mass spectrometry was used to find that the abundance of FGB in the serum of a pancreatic cancer patient was higher than that of a pancreatitis patient and normal people; then, a dot immunoblotting detection device and its detection method for detecting FGB in serum were used to verify a previous mass spectrometry result. In the present embodiment, two groups of mice (7 mice in each group) were subjected to subcutaneous injection of pancreatic cancer cells and intraperitoneal injection of caerulein to construct pancreatic cancer mouse models and pancreatitis mouse models, and the serums of 7 pancreatic cancer mouse models and the serums of 7 pancreatitis mouse models were respectively extracted to prepare a pancreatic cancer mouse group and a pancreatitis mouse group. Mice (7 mice) in a control group were not handled, and the serums of the mice in the control group were extracted to prepare a normal control group; then, the detection method of dot immunoblotting detection is used to detect the relative FGB levels of the serums of the three groups of mice. Detection results were as shown in FIG. 3. Columns a2 to a4 and a5 to a7 were respectively three reference substances at different concentration gradients; columns b, c and d were the pancreatic cancer mouse group (b1, c1 and d1 were the same mouse; b2, c2 and d2 were the same mouse, and by parity of reasoning, the serums of the 7 pancreatic cancer mice were dropwise added into the sample holes); columns e, f and g were the pancreatitis mouse group (e1, f1 and g1 were the same mouse; e2, f2 and g2 were the same mouse, and by parity of reasoning, the serums of the 7 pancreatitis mice were dropwise added into the sample holes); columns h, i and j were the normal reference substance group (h1, i1 and j1 were the same mouse; h2, i2 and j2 were the same mouse, and by parity of reasoning, the serums of the 7 normal mice were dropwise added into the sample holes). After the image was reversed by the Image J software, the gray value of each serum specimen was counted. The relative FGB level of each serum sample was expressed by using a gray value of the sample to be tested/a gray value of a reference sample. The statistics of the relative FGB level of each group was shown in Table 2 and FIG. 4.

TABLE 2

| Group | Number of columns (N) | Median | QL-QU | Max-Min |
|---|---|---|---|---|
| Pancreatic cancer mouse group | 7 | 1.479* | 1.012 | 2.387 |
| Pancreatitis mouse group | 7 | 1.041 | 0.396 | 0.842 |
| Normal control group | 7 | 0.501 | 0.318 | 1.031 |

Note:
*indicates comparison with the pancreatitis group and the normal control group; $P < 0.05$;
QL-QU: an interquartile range; Max-Min: maximum value-minimum value.

Figure 4:
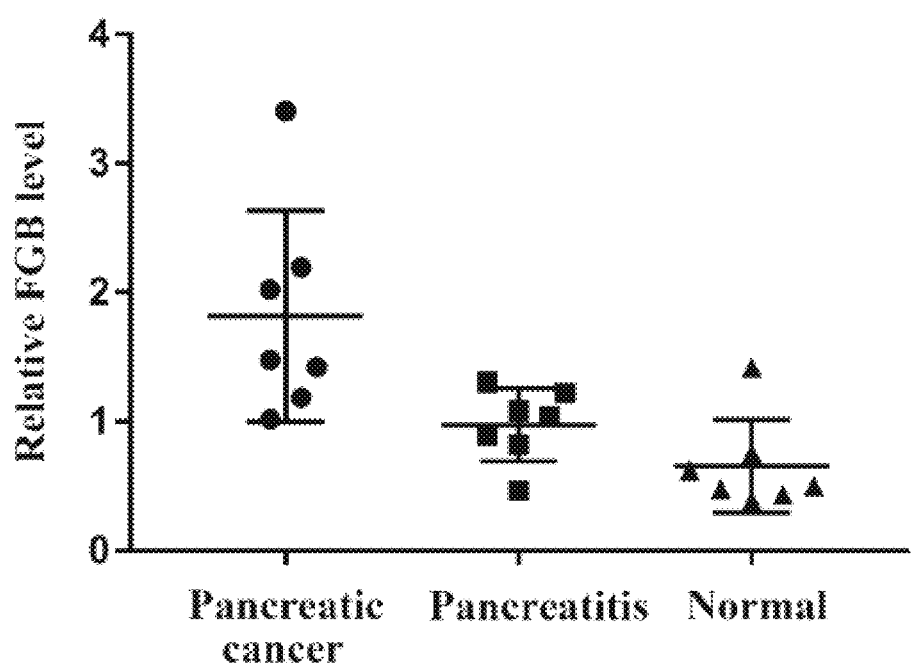
FIG. 4 is a comparison diagram of relative FGB levels, detected by a detection method of dot immunoblotting detection in the present invention, of serums of a pancreatic cancer mouse group, a pancreatitis mouse group and a normal control group.

Results in Table 2 and FIG. 4 show that: the relative FGB levels of the serums of the pancreatic cancer mice are obviously higher than those of the serums of the pancreatitis mice and the normal control group ($P<0.05$), and a relative concentration difference between the pancreatitis group and the normal control group has no statistical significance ($P>0.05$). The results are consistent with the early mass spectrometry results, proving the feasibility of use of the detection device and the detection method of dot immunoblotting detection to detect the FGB in the serum.

The above is the preferred implementation mode of the present invention. It should be noted that those of ordinary skill in the art can further make several improvements and retouches without departing from the principles of the present invention. These improvements and retouches shall all fall within the protection scope of the present invention.

What is claimed is:

1. A detection method of dot immunoblotting detection, comprising:
    connecting a portable sputum aspirator with a hole plate through a hose, cutting a nitrocellulose membrane into a size which is the same as the size of an upper-layer supporting plate on the upper end surface of the hole plate, placing the nitrocellulose membrane onto the hole plate having a plurality of through holes, turning on the portable sputum aspirator, setting a negative pressure value of the portable sputum aspirator to be 0.06 MPa, and forming a plurality of sample injection grooves in the surface of the nitrocellulose membrane;
    dividing the plurality of sample injection grooves into reference substance holes and sample holes, each repeated for three times, separately adding a reference substance and 1 µL of a sample to be tested into each reference substance hole and each sample hole, and naturally air drying the nitrocellulose membrane for 30 minutes at the end of the sample injection;
    placing the nitrocellulose membrane into a skim milk powder solution with a concentration of 5%, placing the skim milk powder solution onto a shaking table for blocking at room temperature for 1.5 hours, abandoning the blocking liquid, and rinsing the membrane with Tris Buffered Saline and Polysorbate-20 (TBS-T), wherein the skim milk powder solution with the concentration of 5% is obtained by diluting a skim milk powder solution with a TBS-T solution until the concentration is 5%;
    diluting a primary antibody with a bovine serum albumin solution with a concentration of 5% in a ratio of 1:500, uniformly and completely immersing the nitrocellulose membrane into the diluted primary antibody, placing the mixture onto the shaking table, carrying out constant temperature incubation at 37° Celsius for 4 hours, and placing the nitrocellulose membrane into the TBS-T at the end of the incubation for washing on the shaking table, for 5 minutes at each time, wherein the bovine serum albumin solution with the concentration of 5% is obtained by diluting a bovine serum albumin solution with the TBS-T solution until the concentration is 5%;
    diluting a secondary antibody with a skim milk powder solution with a concentration of 1% in a ratio of 1:5000, uniformly and completely immersing the nitrocellulose membrane into the diluted secondary antibody, placing the mixture onto the shaking table, carrying out incubation at room temperature for 1.5 hours, and placing the nitrocellulose membrane into the TBS-T at the end of the incubation for washing, for 15 minutes at each time, wherein the skim milk powder solution with the concentration of 1% is obtained by diluting a skim milk powder solution with the TBS-T solution until the concentration is 1%;
    laying the washed nitrocellulose membrane at a proper position of a developing device, uniformly adding dropwise a developer onto the nitrocellulose membrane, and using a gel imaging system to carry out exposure and development, and saving an image; and
    scanning and analyzing, by means of Image J software, a gray value of an image obtained by the development, and expressing a relative concentration of a target protein of each sample by using a gray value of a reference sample;

wherein the TBS-T solution comprises Tris, NaCl, Polysorbate-20 and $ddH_2O$; wherein, a mass of the Tris is 2.42 g; a mass of the NaCl is 8.0 g; a volume of the Polysorbate-20 is 1 mL; and a volume of the TBS-T solution is supplemented to 1000 ml by using the $ddH_2O$; and wherein the secondary antibody is labeled by horse radish peroxidase.

2. The detection method of dot immunoblotting detection according to claim 1, wherein the sample holes are set into a plurality of groups of sample holes according to a group number of samples to be tested.

* * * * *